United States Patent [19]

Malden

[11] Patent Number: 4,900,533
[45] Date of Patent: Feb. 13, 1990

[54] ALKALINE EARTH METAL CARBONATES

[75] Inventor: Peter J. Malden, Lostwithiel, United Kingdom

[73] Assignee: English Clays Lovering Pochin & Company, United Kingdom

[21] Appl. No.: 609,726

[22] Filed: May 14, 1984

Related U.S. Application Data

[63] Continuation-in-part of Ser. No. 350,235, Feb. 19, 1982, abandoned.

[30] Foreign Application Priority Data

Feb. 24, 1981 [GB] United Kingdom ............... 8105785

[51] Int. Cl.$^4$ ..................... C01F 5/21; C01F 11/18
[52] U.S. Cl. ..................... 423/430; 423/165; 423/432; 106/463; 106/464; 8/110
[58] Field of Search ............... 423/430, 432, 165, 175; 106/306, 463, 464; 8/110

[56] References Cited

U.S. PATENT DOCUMENTS

| | | | |
|---|---|---|---|
| Re. 23,794 | 3/1954 | Schur | 423/430 |
| 1,994,271 | 3/1935 | Church | 106/306 |
| 2,520,850 | 8/1950 | Minnick | 423/175 |
| 2,631,922 | 3/1953 | Schur | 423/430 |
| 4,239,736 | 12/1980 | Fenske | 423/430 |

FOREIGN PATENT DOCUMENTS

| | | | |
|---|---|---|---|
| 51-47597 | 4/1976 | Japan | 423/430 |
| 51-47598 | 4/1976 | Japan | 423/430 |
| 58-151326 | 9/1983 | Japan | 423/432 |

OTHER PUBLICATIONS

Lewis, C. J., Some Practical Suggestions on Waste Acid Treatment, Rock Products, vol. 52, #6, Jun. 1945, pp. 117–119, 149.

*Primary Examiner*—Gary P. Straub
*Attorney, Agent, or Firm*—Klauber & Jackson

[57] ABSTRACT

A precipitated alkaline earth metal carbonate is produced by calcining raw alkaline earth metal carbonate, for example a calcium carbonate, under conditions such that substantially all the chemically combined carbon dioxide is driven off to form an oxide, slaking the oxide in water to form a suspension of the corresponding alkaline earth metal hydroxide, allowing the suspension to cool to 45° C. or below, and then carbonating the hydroxide in suspension in water with substantially pure carbon dioxide in the presence of a dithionite bleaching reagent to form a precipitate of an alkaline earth metal carbonate of increased brightness and purity. The precipitate may then be separated from the aqueous medium by, for example, filtration.

6 Claims, No Drawings

ALKALINE EARTH METAL CARBONATES

This application is a continuation-in-part of application Ser. No. 350,235, filed Feb. 19, 1982, now abandoned.

BACKGROUND OF THE INVENTION

This invention relates to alkaline earth metal carbonates and, more particularly, is concerned with a process for producing precipitated alkaline earth metal carbonates.

The precipitated alkaline earth metal carbonate which is manufactured in the largest quantities is precipitated calcium carbonate, optionally associated with varying proportions of magnesium carbonate. Precipitated calcium carbonate and calcium/magnesium carbonate are white pigments used extensively in paper coating compositions and as fillers or extenders for paper, paint, rubber or plastics.

One known method of preparing a precipitated alkaline earth metal carbonate is to calcine a naturally occurring alkaline earth metal carbonate, such as limestone or dolomite, in order to drive off chemically combined carbon dioxide and leave the alkaline earth metal oxide. The alkaline earth metal oxide is slaked in water to form a suspension of the alkaline earth metal hydroxide, and then pure carbon dioxide is passed under controlled conditions through the aqueous suspension of the hydroxide. This process has the disadvantage that, if the raw alkaline earth metal carbonate contains hydrated iron oxides as impurities, the iron is retained throughout the process and is present in the final product, with the result that the product has a yellowish discoloration and a relatively low brightness, or reflectance to visible light. This problem has been recognized for a long time and several attempts have been made to overcome the problem, see for example U.S. Pat. Specification No. 1,994,271 (Church et al) and U.S. Pat. Specification No. 2,520,850 (Minnick). However, the results achieved in practice have not been satisfactory and, for this reason, much naturally occurring limestone and dolomite has been considered unsuitable for use as a raw material for making precipitated alkaline earth metal carbonates.

SUMMARY OF THE INVENTION

According to the present invention there is provided, in a process for producing a precipitated alkaline earth metal carbonate which process comprises the steps of (a) calcining a raw alkaline earth metal carbonate under conditions such that substantially all the chemically combined carbon dioxide is driven off to form an oxide, (b) slaking the oxide in water to form an aqueous suspension of the corresponding alkaline earth metal hydroxide, (c) carbonating the aqueous suspension of the hydroxide with substantially pure carbon dioxide under conditions which result in the formation of a precipitate of an alkaline earth metal carbonate and (d) separating the precipitate from the aqueous medium, the improvement which comprises allowing the product of step (b) to cool to about 45° C. or below, and then carrying out step (c) at an alkaline pH and in the presence of a dithionite bleaching agent whereby there is obtained a precipitate of an alkaline earth metal carbonate of increased brightness and purity.

The process of the present invention is particularly suitable for preparing a precipitated calcium carbonate so that in step (a) the raw alkaline earth metal carbonate is preferably a calcium carbonate, such as limestone, marble or chalk, or a calcium/magnesium carbonate such as dolomite. It is not essential to reduce the lump size of the alkaline earth metal carbonate before calcination, but, as a general rule, the larger the lumps, the longer is the calcining time. It is therefore advantageous to crush and screen the alkaline earth metal carbonate, e.g. limestone, before calcination.

In set (c) the dithionite bleaching reagent is preferably sodium or zinc dithionite. Advantageously, there is used from 1 to 20 lbs of dithionite bleaching reagent per ton of dry alkaline earth metal carbonate (0.45 to 9.0 kg per tonne). The dithionite can be formed in situ. Although it is not strictly necessary to complete the slaking operation before adding the reducing bleaching agent, the high temperatures generated by the slaking tend to decompose the bleaching agent and it is therefore important to allow the slaking process to proceed to completion and the suspension to cool to about 45° C. or below before adding the reducing bleaching agent.

In step (d) the precipitate of the alkaline earth metal carbonate may be separated from the aqueous medium by filtration or centrifugal or gravitational sedimentation.

A dithionite bleaching reagent extracts the iron-containing impurities from the alkaline earth metal hydroxide in a reduced and soluble form so that when the precipitate is separated from the aqueous medium the iron compounds remain in the aqueous medium. A further improvement in the brightness of the carbonate may generally be obtained by washing the cake of separated p⁓ ⁓ one or more times in mains or other subst. .1 water. The washing may be effected by resu... ding the cake of separated precipitate in substantially clean water and repeating the separation or by passing substantially clean water through the cake in situ in the filterpress or centrifuge in which it was formed.

The invention is illustrated by the following Examples.

EXAMPLE 1

A sample of crude limestone was crushed and screened on a No. 60 mesh B.S. sieve (nominal aperture 0.25 mm) and 50 g of the material which passed through the sieve was heated for 1 hour at a temperature of 1000° C. These conditions were sufficient to convert substantially all of the calcium carbonate to calcium oxide.

The calcium oxide was allowed to cool and then added to 200 ml of water in a beaker, the contents of the beaker being stirred continuously by hand to ensure even dissipation of the heat generated during the slaking operation. When a uniform suspension of calcium hydroxide had been achieved 0.2 g of sodium dithionite was added with stirring to the suspension in the beaker and carbon dioxide gas was passed through the suspension until the pH of the suspension had fallen to below 10.5 (preferably about 9.5). During carbonation the temperature of the suspension was maintained at around 45° C. When carbonation was complete the suspension was filtered and the precipitate washed once by passing 200 ml of water through the cake on the filter.

The cake was then dried to zero water content at 100° C. and the dry calcium carbonate milled to a uniform powder in a Janke and Kunkel high-speed, water-cooled analytical mill of the coffee grinder type. The pulverised product was then tested for reflectance to light of 457 mm. and 570 mm. wavelengths in an Elrepho brightness meter.

The experiment was then repeated as described above but with no sodium dithionite present during the carbonation step.

The results obtained are set forth in the following Table I:

TABLE I

| Amount of sodium dithionite (kg. per tonne of dry calcium carbonate) | % reflectance to light of wavelength | |
|---|---|---|
| | 457 nm | 570 nm |
| 4.0 | 96.2 | 97.1 |
| 0 | 91.0 | 94.6 |

These results show that when sodium dithionite is present during the carbonation step the brightness is higher and also the whiteness or uniformity of color as indicated by the relatively small difference between the reflectance values obtained for the two wavelengths. The calcium carbonate produced by carbonation of slaked lime in the absence of sodium dithionite has a distinct yellowish discolouration.

EXAMPLE 2

Samples of five different crude limestones were crushed and screened on a No. 60 mesh B.S. sieve and in each case 50 g of the material which passed through the sieve was heated for 1 hour at a temperature of 1000° C.

In each case the calcium oxide sample thus formed was allowed to cool and then added to 200 ml of water in a beaker, the contents of the beaker being stirred continuously by hand to ensure even dissipation of the heat generated during the slaking operating. When a uniform suspension of calcium hydroxide had been achieved 0.2 g of sodium dithionite was added with stirring to the suspension in the beaker and carbon dioxide gas was passed through the suspension until the pH of the suspension had fallen to about 9.5. During carbonation the temperature of the suspension was maintained at around 45° C. When carbonation was complete the suspension was filtered and the precipitate washed once by passing 200 ml of water through the cake on the filter.

In each case the cake was dried to zero water content at 100° C. and the dry calcium carbonate milled to a uniform powder in the Janke and Kunkel high speed mill. The pulverised product was then tested for reflectance to light of 457 nm and 570 nm wavelength in the Elrepho brightness meter.

The experiment was then repeated as described above for each of the five crude limestones but with no sodium dithionite present during the carbonation step. Instead, on completion of the carbonation step, air was blown through the suspension to remove carbon dioxide. The suspension was then heated to 45° C. and 0.2 g of sodium dithionite was added. The resultant mixture was stirred for 10 minutes, after which the suspension was filtered and the precipitate washed, dried, milled and tested for reflectance to light as described above.

As a further comparison, the experiment was repeated for each of the five crude limestones except that no sodium dithionite was used at any stage of the process.

The results obtained are set forth in the following Table II:

TABLE II

| | Limestone No bleaching | | Bleached after carbonation | | Bleached during carbonation | |
|---|---|---|---|---|---|---|
| | % reflectance to light of wavelength | | | | | |
| sample | 457 nm | 570 nm | 457 nm | 570 nm | 457 nm | 570 nm |
| I | 95.3 | 96.4 | 97.2 | 97.6 | 98.0 | 98.0 |
| II | 91.0 | 94.6 | 93.7 | 96.0 | 96.2 | 97.1 |
| III | 88.8 | 92.7 | 89.3 | 93.7 | 89.8 | 94.3 |
| IV | 94.4 | 96.8 | 96.0 | 96.9 | 97.0 | 97.1 |
| V | 90.1 | 93.9 | 93.4 | 94.8 | 94.8 | 95.6 |

These results show that not only are higher values obtained for the reflectance to light of both wavelengths when the sodium dithionite bleaching reagent is present during the carbonation step, but also that in the cases of all the limestone samples with the exception of sample III the difference between the reflectance values obtained at the two wavelengths is smaller, thus indicating a white, or less yellow, colouration.

EXAMPLE 3

A sample of a crude limestone was crushed and screened on a No. 60 mesh B.S. sieve and 400 g of the material which passed through the sieve was then calcined by heating for 1 hour at a temperature of 1000° C. The calcium oxide thus formed was allowed to cool and then added to 600 ml of cold water in a beaker, the contents of the beaker were stirred and the slurry thus formed gradually diluted with stirring to 1800 ml. When a uniform suspension of calcium hydroxide had been achieved 2 g of sodium dithionite was added with stirring to the suspension in the beaker and carbon dioxide gas was passed through the suspension for 25 minutes, after which time the pH of the suspension was found to have fallen to about 9.5. During carbonation the temperature of the suspension was maintained at around 45° C. When carbonation was complete the suspension was filtered and the precipitate washed by resuspension in 1800 ml of water, refiltered and the cake dried to zero water content at 100° C. The dry calcium carbonate product was then milled to a uniform powder in the Janke and Kunkel high speed mill and the pulverised product tested for reflectance to light of 457 nm. and 570 nm. wavelength in the Elrepho brightness meter.

The experiment described above was then repeated except that, instead of the sodium dithionite, there was added 6 g. of hydrated sodium sulphide ($Na_2S.9H_2O$).

The results obtained are set forth in the following Table III. The "yellowness" figure is obtaining by subtracting the percentage reflectance to light of wavelength 457 nm from that to light of wavelength 570 nm and gives a measure of the intensity of the yellow colouration of the sample.

TABLE III

| Bleaching reagent | % reflectance to light of wavelength | | "yellowness" (b − a) |
|---|---|---|---|
| | 457 nm(a) | 570 nm(b) | |
| Sodium dithionite | 96.1 | 96.6 | 0.5 |
| Sodium sulphide | 95.8 | 96.9 | 1.1 |

These results show that the calcium carbonate produced by carbonating calcium hydroxide in the presence of sodium dithionite has a better percentage reflectance to light of wavelength 457 nm (or overall "brightness") than the calcium carbonate produced by carbonation in the presence of sodium sulphide. Also the "yellowness" of the calcium carbonate produced by carbonation of calcium hydroxide in the presence of sodium dithionite is significantly lower indicating that this calcium carbonate has a white colour.

I claim:

1. In a process for producing a precipitated alkaline earth metal carbonate which process comprises the steps of (a) calcining a raw alkaline earth metal carbonate under conditions such that substantially all the chemically combined carbon dioxide is driven off to form an oxide, (b) slaking the oxide in water to form an aqueous suspension of the corresponding alkaline earth metal hydroxide, (c) carbonating the aqueous suspension of the hydroxide with substantially pure carbon dioxide under conditions which result in the formation of a precipitate of an alkaline earth metal carbonate and (d) separating the precipitate from the aqueous medium, the improvement which comprises allowing the product of step (b) to cool to about 45° C. or below, and then carrying out step (c) at an alkaline pH and in the presence of a dithionite bleaching agent whereby there is obtained a precipitate of an alkaline earth metal carbonate of increased brightness and purity.

2. A process according to claim 1, wherein the precipitate of the alkaline earth metal carbonate is separated from the aqueous medium by filtration or centrifugal or gravitational sedimentation.

3. A process according to claim 1, wherein after step (d) the precipitate of the alkaline earth metal carbonate is washed one or more times.

4. A process according to claim 1, wherein the raw alkaline earth metal is crushed before it is calcined.

5. A process according to claim 1, wherein the raw alkaline earth metal is a calcium carbonate.

6. A process for producing a precipitated alkaline earth metal carbonate which process comprises the steps of (a) calcining a raw alkaline earth metal carbonate under conditions such that substantially all the chemically combined carbon dioxide is driven off to form an oxide, (b)(i) slaking the oxide in water to form an aqueous suspension of the corresponding alkaline earth metal hydroxide, (b)(ii) allowing the suspension of the alkaline earth metal hydroxide to cool to a temperature not greater than about 45° C., (c) carbonating the aqueous suspension of the alkaline earth metal hydroxide with substantially pure carbon dioxide in the presence of a dithionite bleaching agent and under conditions resulting in the formation of a precipitate of an alkaline earth metal carbonate, (d) dewatering the product of step (c) to form a cake of the alkaline earth metal carbonate, and (e) washing the cake of the desired alkaline earth metal carbonate at least once with clean water.

* * * * *